United States Patent [19]

Gmeiner et al.

[11] Patent Number: 4,936,626
[45] Date of Patent: Jun. 26, 1990

[54] SWIVEL-ASSISTANCE TO A ROOF-SKIN HOLDING BOW FORMING THE LOWER END OF A FOLDING CANOPY

[75] Inventors: Günter Gmeiner, Sindelfingen; Christian Grabner, Gechingen; Klaus Claar, Sindelfingen; Jürgen Schrader, Böblingen; Hermann Moeller, Gärtringen, all of Fed. Rep. of Germany

[73] Assignee: Daimler-Benz AG, Fed. Rep. of Germany

[21] Appl. No.: 330,900

[22] Filed: Mar. 31, 1989

[30] Foreign Application Priority Data

Mar. 31, 1988 [DE] Fed. Rep. of Germany ....... 3811010
Jan. 14, 1989 [DE] Fed. Rep. of Germany ....... 3901051

[51] Int. Cl.$^5$ .............................................. B60J 7/12
[52] U.S. Cl. .................................... 296/108; 296/116; 296/117
[58] Field of Search ................ 296/117, 116, 108, 107

[56] References Cited

U.S. PATENT DOCUMENTS

| | | | |
|---|---|---|---|
| 2,970,007 | 1/1961 | Hennessy | 296/117 |
| 3,252,731 | 5/1966 | Brynn et al. | 296/117 |
| 3,442,551 | 5/1969 | Hussey | 296/117 |
| 3,453,021 | 7/1969 | Adamski | 296/117 |
| 4,671,559 | 6/1987 | Kolb | 296/107 |
| 4,741,571 | 5/1988 | Godette | 296/107 |

FOREIGN PATENT DOCUMENTS 1630305 6/1971 Fed. Rep. of Germany.
2513302 10/1976 Fed. Rep. of Germany.
3724531 12/1988 Fed. Rep. of Germany.

Primary Examiner—Robert R. Song
Attorney, Agent, or Firm—Evenson, Wands, Edwards, Lenahan & McKeown

[57] ABSTRACT

For swivel-assistance to a roof-skin holding bow forming the lower end of a folding canopy, lateral limbs of the holding bow being affixed to associated canopy struts of a main hoop, there is provided a rod element, the length of which can be altered, which is articulated at both ends and is arranged in the side wall region of the folding canopy. Since on end of the rod element is connected to the facing lateral limb of the roof-skin holding bow and the second end of the rod element is connected in articulated fashion to the associated canopy strut, the rod element can be arranged in space-saving manner in the side board.

13 Claims, 4 Drawing Sheets

SWIVEL-ASSISTANCE TO A ROOF-SKIN HOLDING BOW FORMING THE LOWER END OF A FOLDING CANOPY

BACKGROUND AND SUMMARY OF THE INVENTION

The present invention generally relates to the swivel-assistance to a roof-skin holding bow forming the lower end of a folding canopy and more particularly to a space saving arrangement for swivel-assisting rod elements.

A swivel-assistance of the type concerned here can be taken as already known from German Published Unexamined Patent Application No. 1,630,305. In this prior art, one approximately horizontally arranged hydraulic cylinder, having an end facing away from the main hoop which is articulated on a bearing block fixed to the bodywork, is situated on either side of a motor vehicle in the limbs of a canopy compartment. By subjecting the hydraulic cylinder to pressure, this taking place automatically under control by fluidic limit switches, the roof-skin holding bow and, together with the latter, the rear part of the canopy is swung up forwards or folded back into its approximately horizontal starting position, in accordance with requirements. During this procedure, the main hoop, to which the lateral limbs of the roof-skin holding bow are affixed, retains its raised, essentially vertical position.

To lower the folding canopy into the canopy compartment, the main hoop can be tilted over, being driven to swivel by two hydraulic cylinders which are associated with the two canopy struts of the main hoop, act on the latter and are likewise supported by being fixed to the bodywork. During this procedure, the hydraulic cylinders which are articulated on the main hoop retract and simultaneously push the piston rods of the corresponding hydraulic cylinders articulated on the holding bow into their cylinders.

Because of the automatic sequential control of the folding of all canopy parts, a high degree of user convenience is already ensured. However, this is achieved at the price of accepting the need for a considerable installation and movement clearance in order to accommodate the two hydraulic cylinders near to the canopy compartment and this has a disadvantageous effect, in particular on the overall depth of the sideboards of the vehicle.

Thus it is an object of the present invention to provide swivel-assistance of a roof-skin holding bow of a folding canopy in such a way that a space-saving arrangement of the swivel-assisting rod elements is possible.

According to the certain advantageous features of preferred embodiments of the present invention, the second end of the rod element is connected in articulated fashion to the associated canopy strut. Thus, as seen in the transverse direction of the folding canopy, it is possible to arrange the rod element next to the lower longitudinal section of the canopy strut. In addition, by reason of its articulation, the rod element participates in all swivelling movements of the main hoop, with the result that its position relative to the canopy strut changes slightly only in the course of its own length alteration. In order to avoid deformations of the roof-skin holding bow by the assisting forces of the rod element, the bilateral swivel-assistance of the roof-skin holding bow will in general be expedient, i.e. the allocation of two rod elements of equal assisting force to the two lateral limbs of the roof-skin holding bow.

Advantageous further developments of the subject-matter of the invention will be apparent as the description of the invention and its embodiment proceeds.

It is to be regarded as advantageous if the length of the rod element is fixed at the supporting length it exhibits when the roof-skin holding bow is raised. In this case, the length-locked rod element can simultaneously serve as a guide, which, in cooperation with further linkage members, can assume the mechanical obligatory control of the roof-skin holding bow in the longitudinal direction of the vehicle which is necessary for lowering the folding canopy into the canopy compartment.

For fixing the length, mechanical engagement devices which, in the simplest case, can be manually actuatable, are envisioned.

However, automatically locking rod elements, which do not require any intervention, are to be recommended. Such rod elements, which are also used as openers for tailgates or the like, in the form of so-called gas-filled spring devices, are generally known. An example of a prior art publication which may be mentioned here is German Patent No. 2,513,302, which discloses an automatically lockable pneumatic or hydropneumatic telescopic spring.

However, rod elements whose length can be altered under spring force have the disadvantage that they can only have an assisting effect in one swivelling direction of the roof-skin holding bow, while, in the opposite direction, they inhibit the advance.

It is therefore preferable to provide a double-acting working cylinder as rod element. The latter is particularly true when a pressure and/or suction source which can also be used for loading the working cylinder is present anyway for automatic canopy actuation. In this case, however, a hose permanently connected to the working cylinder is required for the working medium, the hose being connected to the pressure and/or suction source. The flexible hose must here be laid such that it can compensate for the relative movements with respect to the bodywork without being pinched off or damaged. It is particularly simple to lay the hose in this way if the working cylinder is arranged in the clear fork cross-section of an end region, near the main bearing, of the associated canopy strut. In addition, this type of arrangement results in a particularly compact accommodation of the rod element.

To convert the advance of the rod element into a swivelling movement of the roof-skin holding bow, however, a connecting lever fixed to the holding bow must be present between the fork faces of the canopy strut, while the end region of the lateral limb, due to its function, must lie further out than this clear canopy strut cross-section which accommodates the rod element. For this reason, an arm which is connected rotationally fast to the mounted end of the lateral limb is swivel-mounted between the fork faces at the articulation point of the roof-skin holding bow on the main strut. Customary transmission linkages are suitable for the rotationally fast connection.

It is possible to dispense with rod elements which can be fixed in length, if the roof-skin holding bow itself is held under a spring loading in its lowered position against associated stops, said position lying approximately parallel behind the roof-skin holding rails.

If the rod elements provided are gas-filled spring devices or similar compression spring arrangements, these can simultaneously be used as well for the desired spring loading by being articulated under an overcenter arrangement.

Because of the tolerance-compensating effect of this principle, inexpensive rod elements can be used here.

Other objects, advantages and novel features of the present invention will become apparent from the following detailed description of the invention when considered in conjunction with the accompanying drawings.

DETAILED DESCRIPTION OF THE DRAWINGS

Two exemplary embodiments of the invention are explained in greater detail below with reference to the various Figures of the present invention.

Figure 1:
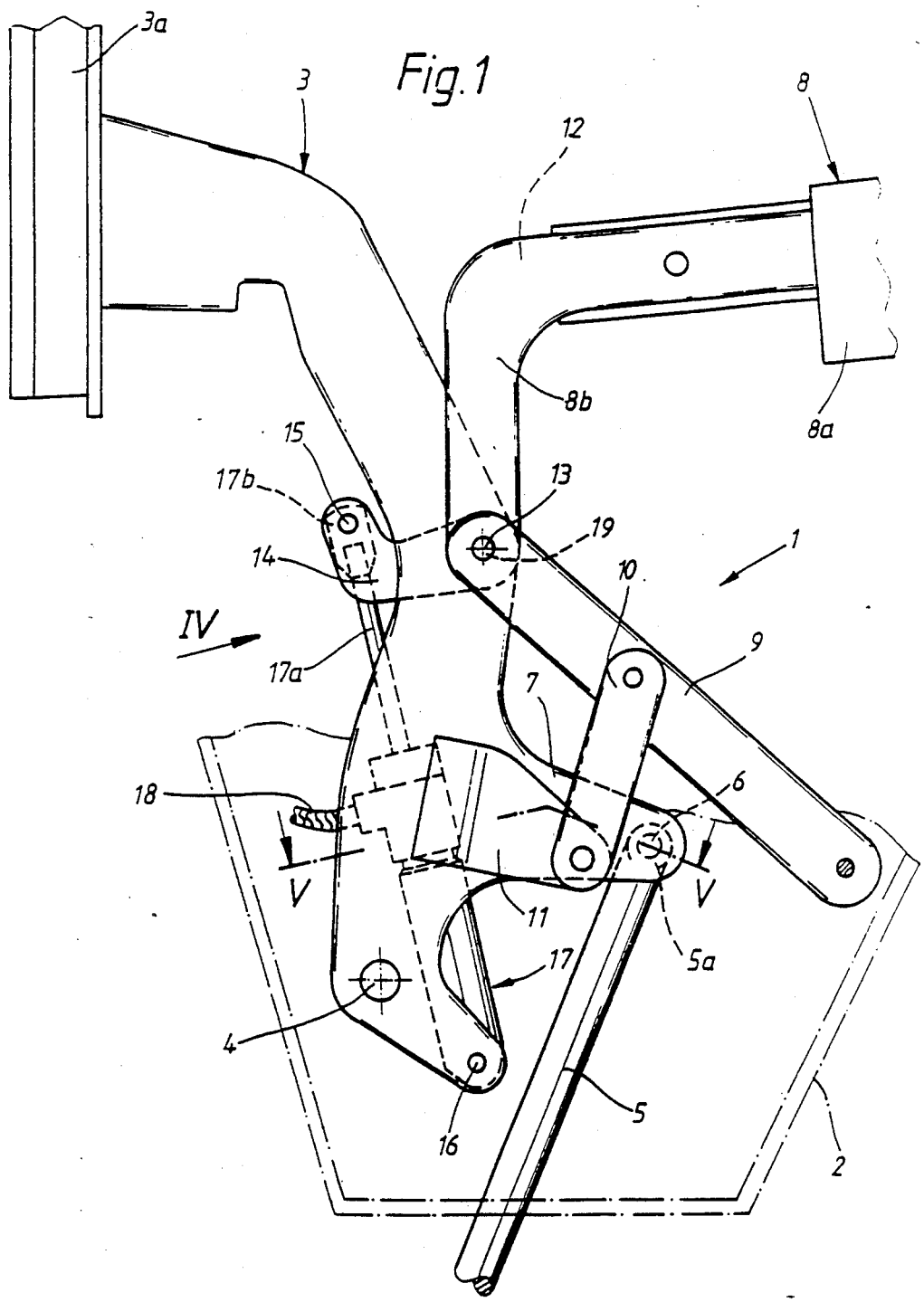
FIG. 1 shows a schematic side view of a lever mechanism of a folding canopy with the canopy closed.

Referring to FIG. 1, a folding canopy (not represented in greater detail) of a motor vehicle, which can be lowered completely into a canopy compartment in the bodywork, is affixed by its side wall linkage to the bodywork in a central transverse plane of the vehicle. For the purpose of limiting the swivelling, the side wall linkage forms part of a lever mechanism 1 which is arranged sunk in both side-boards. Each of the two lever mechanisms 1 is mounted in lateral brackets 2 fixed to the bodywork, which lie in front of the associated limb of the canopy compartment. Since, in relation to the central longitudinal plane of the vehicle, the lever mechanisms 1 are of mirror-image design, only the left-hand lever mechanisms 1 has, for reasons of simplicity, been represented.

The left-hand canopy strut 3 of a main hoop spanning the width of the roof is mounted directly in the bracket 2. It is mounted on the circumference of a bearing pin 4 which is fixed to the bracket and provides an axis direction running perpendicular to the central longitudinal plane of the motor vehicle. The main hoop is depicted in FIG. 1 in a raised position in which a roof-skin holding rail 3a of the canopy strut runs parallel to the rear window edge of a side window of the motor vehicle. It is held in this position by an extended piston rod 5 of a hydraulic cylinder, the cylinder of which is arranged below the bracket 2 such that it is no longer visible. The lower end of the cylinder is articulated so as to be fixed on the bodywork.

For supporting the canopy strut 3, the end of the piston rod 5 has a bearing eye 5a which surrounds an associated bearing pin 6. The bearing pin 6 is arranged in the end region of an actuating lever 7 which is fixed to or integral with the canopy strut 3 and projects backwards from the canopy strut 3. This results in a sufficient lever arm, relative to the bearing pin 4, for the hydraulic cylinder, so that, by retracting the piston rod 5 into the cylinder, the canopy strut 3 can be swivelled by 90° in the clockwise direction when the folding canopy is to be lowered into the canopy compartment. When the piston rod 5 is extended, the canopy strut 3 reassumes its raised position, in which it is supported by the piston rod 5.

A roof-skin holding bow 8, forming the rearward end of the folding canopy, can be swivelled about a horizontal transverse axis of the vehicle, relative to the raised canopy strut 3. This ability to swivel is required in order to enable a canopy compartment lid (not shown) affixed in opposition to the roof-skin folding bow 8 and on which the roof-skin holding bow 8 rests when the canopy is closed, to be swivelled past the roof-skin holding bow 8. For the purpose of the swivel-mounting, an associated left-hand lateral limb 8a of the roof-skin folding bow 8 is mounted in its forward end region on the canopy strut 3.

In order to make it possible to provide the lateral limb 8a with a stop near to the bracket 2, the lateral limb 8a ends in a downward-angled bent lever 8b which is pivotably mounted at its end on the upper end of a guide 9. The guide 9 extends obliquely backwards and downwards, its lower end being connected in articulated fashion to the bracket 2, and serves to control the advance of the roof-skin holding bow 8 in the longitudinal direction of the vehicle in the course of the process of lowering the main hoop.

To provide mechanical obligatory control as a function of the swivel angle of the canopy strut 3, a transmission lever 10 which extends obliquely downwards towards the front engages in articulated fashion in the central region of the guide 9. At its second end, the transmission lever 10 is pivotably mounted on a lug 11 which is welded onto the outside of the canopy strut 3 and projects backwards parallel to the actuating lever 7. As long as the canopy strut 3 remains in the raised position, the guide 9 is thus locked via the transmission lever 10 against swivelling, with the result that a quasi-stationary swivel-mounting of the bent lever 8b on the guide 9 is ensured.

In order that a swivelling thrust can be exerted on the roof-skin holding bow 8, there lies behind the bent lever 8b a second angled lever 12 of the same shape. In contrast to the bent lever 8b, however, this lever 12 is not rigidly connected to the lateral limb 8a but is connected to it via a rotary/sliding articulation of a type known per se. For this purpose the lever 12 is articulated in a manner not shown on a crosshead which is longitudinally displaceably guided in the lateral limb 8a. The lower end of the lever 12 is pivotably mounted directly on the canopy strut 3.

In this arrangement, the center of rotation is determined such that it is exactly aligned with the articulation point of the bent lever 8b on the guide 9, a common geometrical swivelling axis 13 thereby resulting. An arm 14 is connected rotationally fast to the lever 12, which arm, projecting beyond the swivelling axis 13, projects approximately parallel to the direction of extension of the lateral limb 8a in the opposite direction. That end of the arm 14 which faces away from the swivelling axis 13 is provided with a transverse pin 15 which is secured axially against sliding in the arm 14.

At the lower end of the canopy strut 3, which end extends behind the bearing pin 4 to below the latter, is arranged a second transverse pin 16 extending perpendicular to the surface plane of the flat profile of the canopy strut 3. On the two transverse pins 15 and 16 are articulated the ends of a rod element, the length of which can be altered and which, in FIGS. 1 and 2, comprises a double-acting hydraulic cylinder 17. Via a hose 18, the hydraulic cylinder 17 communicates with a central hydraulic dual-function pump (not shown) designed to supply all the hydraulic cylinders provided. The hydraulic cylinder 17 is controlled in known manner via electromagnetic valves, the starting position being sensed by customary microswitches. As a result, the hydraulic cylinder 17 can automatically be subjected to pressure or suction in accordance with requirements.

Figure 2:
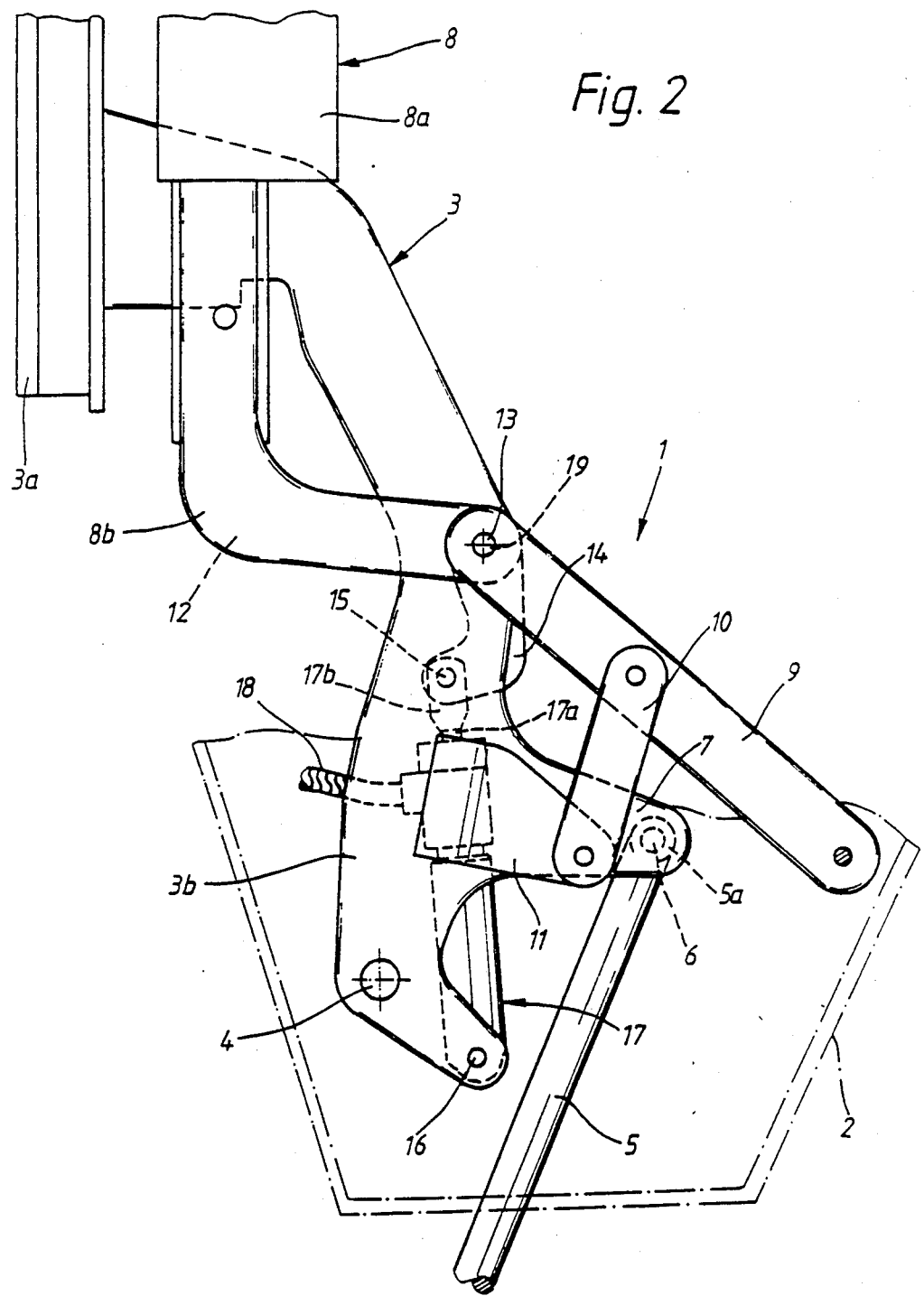
FIG. 2 shows the lever mechanism according to FIG. 1 with the roof-skin holding bow raised.

In the case of subjection to pressure, the piston rod 17a of the hydraulic cylinder 17 retracts the roof-skin holding bow 8 being swivelled out of the position in which it rests on the canopy compartment according to FIG. 1 into its raised position according to FIG. 2, in which it is held by maintenance of the pressure in the hydraulic cylinder 17. For lowering the folding canopy, the canopy compartment lid is then opened and, when this has reached its opened end position, the piston rod 5 is retracted, the canopy strut 3 being tilted over. The roof-skin holding bow 8 participates in this return swivelling movement of the main hoop in a swivelling position corresponding approximately to that in FIG. 2 with respect to the canopy strut 3, although, by reason of its mechanical obligatory control via the guide 9 and the transmission lever 10, it is displaced forwards as a function of the swivel angle of the main strut 3 in order to ensure that descent into the opening of the canopy compartment is possible.

During this return swivelling movement, the hydraulic cylinder 17 acts like a rigid guide, which fixes the lever 12 in its position parallel to the roof-skin holding rail 3a, said position corresponding to that in FIG. 2, while, by reason of the crosshead articulation, a slight relative deflection of the lateral limb 8a in relation to the roof-skin holding rail 3a remains possible.

This guide characteristic of the hydraulic cylinder 17 is retained until, in the course of a renewed closing procedure of the folding canopy, the canopy strut 3 has reassumed its raised position in accordance with FIG. 2. The hydraulic cylinder 17 can then be subjected to suction, the piston rod 17a being extended until the position in which the roof-skin holding bow rests on the canopy compartment is reached again as shown in FIG. 1.

While retaining the same arrangement as that of the hydraulic cylinder 17, it would be possible instead of the latter to use, for example, a gas-filled spring device, although with this swivel-assistance would only be possible in one swivelling direction. The gas-filled spring device could also assume the guide function of the hydraulic cylinder 17 if it could be locked in the retracted position. The direction of swivel-assistance could be either a stroke-assistance in the sense of a spring loading of the roof-skin holding bow 8 in the counterclockwise direction or a spring loading in the clockwise direction. Although, in the event of the latter, the roof-skin holding bow 8 would have to be held by hand in its raised position, it would simplify operation in the case of manual actuation of the folding canopy, since the folding sequence would thereby be partially functionally predetermined.

Instead of a rod element fixable or fixed in its supporting length, it is furthermore conceivable to exert the swivelling thrust on the roof-skin holding bow 8 by means of a rod element, the length of which can be altered, but, after the roof-skin holding bow 8 has reached its folding position near to the main hoop, to hold the latter in this folding position by a spring-loaded relative to the canopy struts 3.

An application of this principle in the driving of the roof-skin holding bow 8 to swivel by hydraulic cylinders 17 has the advantage that, after the completion of their working stroke, said cylinders can be switched to the non-pressurized condition without affecting the folding position of the roof-skin holding bow 8.

If, on the other hand, manual canopy actuation combined with a compression spring arrangement for swivel-assistance to the roof-skin holding bow 8 is envisaged, the compression spring arrangement driving the roof-skin holding bow 8 can advantageously be used as well for fixing the folding position of the roof-skin holding bow 8.

The possibility of this double use of the compression spring arrangement is relatively unproblematic if the compression spring arrangement loads the roof-skin holding bow 8 to swivel in the counterclockwise direction about the geometrical axis 13, i.e. towards the main hoop. In this arrangement, the outward spring displacement of the compression spring arrangement would merely have to be of sufficient length and the swivel angle of the roof-skin holding bow 8 relative to the canopy struts 3 be limited by stops.

Figure 3:
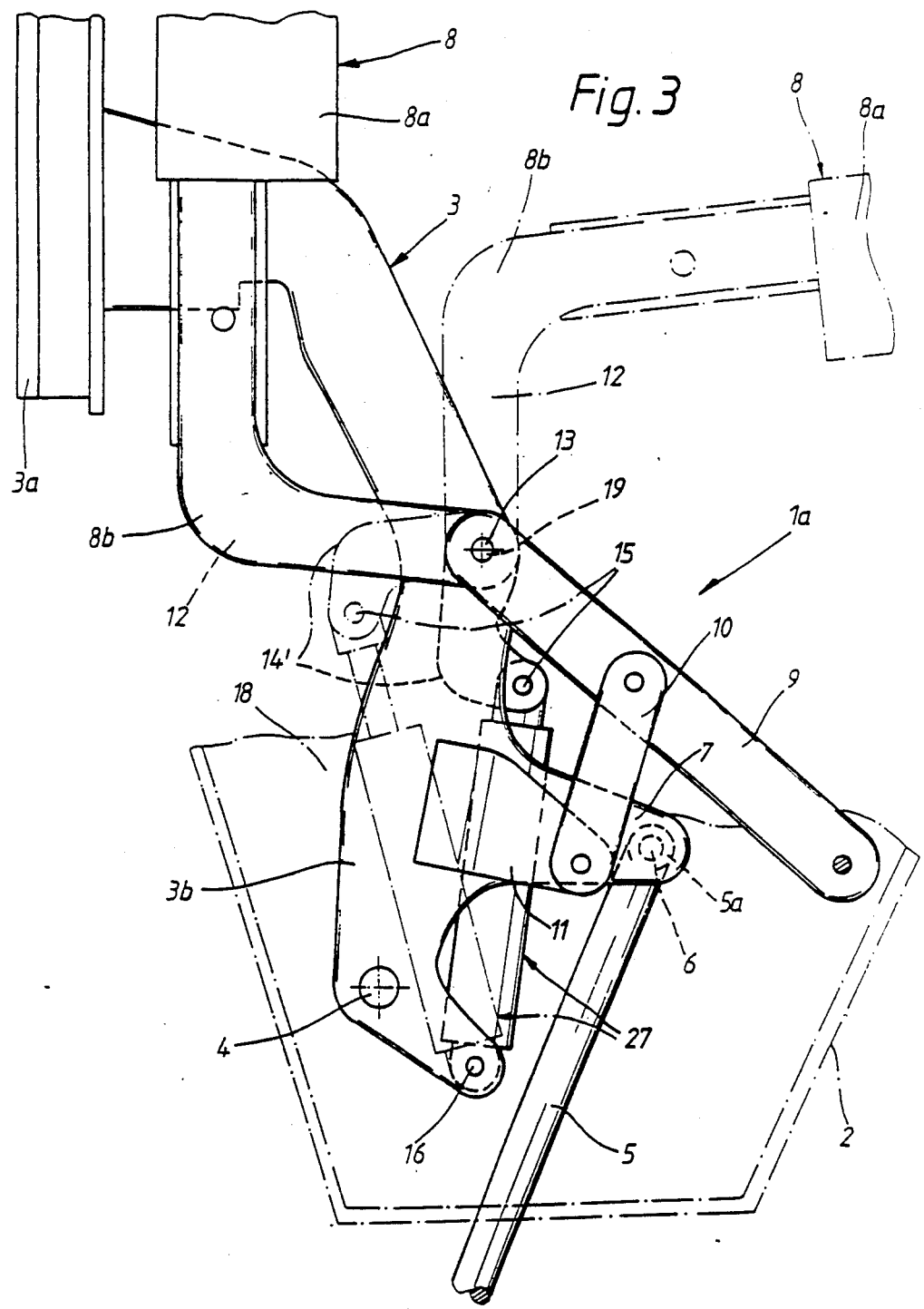
FIG. 3 shows a side view of the lever mechanism in the positions visible from FIG. 1 and FIG. 2, with a gas-filled spring arrangement.

In the case of a compression spring loading of the roof-skin holding bow 8 in the clockwise direction, i.e. an assistance of the return swivelling movement away from the main hoop, it is still possible to make double use of the compression spring arrangement. An articulation, provided for this purpose, of a gas-filled spring device 27, which is preferably to be used because of its low weight, in the lever mechanism 1a can be seen from FIG. 3. Since the lever mechanism 1a corresponds substantially to the lever mechanism 1 already described, for reasons of simplicity only the functional differences are explained, parts of identical construction being provided with identical reference numerals.

The representation of the lever mechanism 1a includes both positions corresponding to FIGS. 1 and 2, the intermediate position corresponding to FIG. 2 being drawn using solid lines. In this intermediate position, an arm 14', which is mounted on the pin 19 and is connected rotationally fast to the lever 12, likewise mounted on the pin 19, projects obliquely backwards away from the pin 19, being directed downwards.

In this arrangement, the arm 14' is dimensioned such that its end supporting the transverse pin 15 lies behind a connecting line between the bearing pin 19 and the transverse pin 16, as seen in the longitudinal direction of the vehicle.

The ends of the gas-filled spring device 27 are articulated on the transverse pins 15 and 16, as a result of which the line of action of the spring force, said line of action extending along the central longitudinal axis of the gas-filled spring device 27, also runs at a distance behind the bearing pin 19. As a function of the distance of this line of action from the bearing pin 19, the force of the only slightly extended gas-filled spring device 27 generates a counterclockwise moment about the bearing pin 19, by means of which moment the roof-skin holding bow 8 is loaded to swivel in the counterclockwise direction.

However, since, in the raised intermediate position, the holding bow 8 is supported on the canopy struts 3 via stops (not shown), it is held in its position parallel to the roof-skin holding rails 3a by the outward-directed spring force of the gas-filled spring device 27. The holding forces must here be dimensioned such that this parallel position is reliably maintained even in the course of a procedure involving the lowering of the folding canopy.

In the final closing phase of the folding canopy, the erect roof-skin holding bow 8 must first of all be swivelled back so far by manual intervention that the over-center position of the gas-filled spring device 27 is overcome, after which the line of action of the latter runs to the left of the bearing pin 19.

Since, after passing its dead center position, the gas-filled spring device 27 acts in the opposite direction on the arm 14', a clockwise moment is now exerted on the roof-skin holding bow 8, this moment assisting the return swivelling movement of the bow to an increasing extent. This assisting force is maintained as the gas-filled spring device 27 advances outwards, until the roof-skin holding bow 8 has assumed the position in which it rests on the canopy compartment lid, said position being represented by broken lines.

Irrespective of whether a hydraulic cylinder 17 or a gas-filled spring device 27 or the like is used as rod element, the length of which can be altered, the arrangement can be made such that the rod element is situated on the inside next to a lower end region 3b of the canopy strut 3 and that, in the course of the change in length, it has a movement path parallel to the broad side of the end region 3b, which path can run substantially within the breadth of the end region 3b. As a result, hardly any additional installation space is required.

Figure 4:
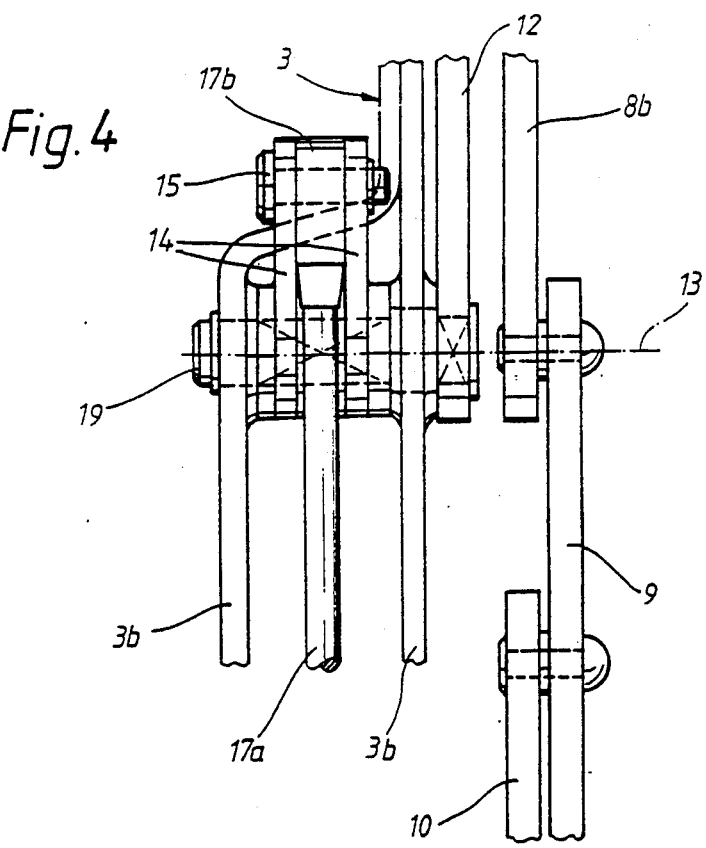
FIG. 4 shows a front view of the articulation region of the rod element on the holding bow.
Figure 5:
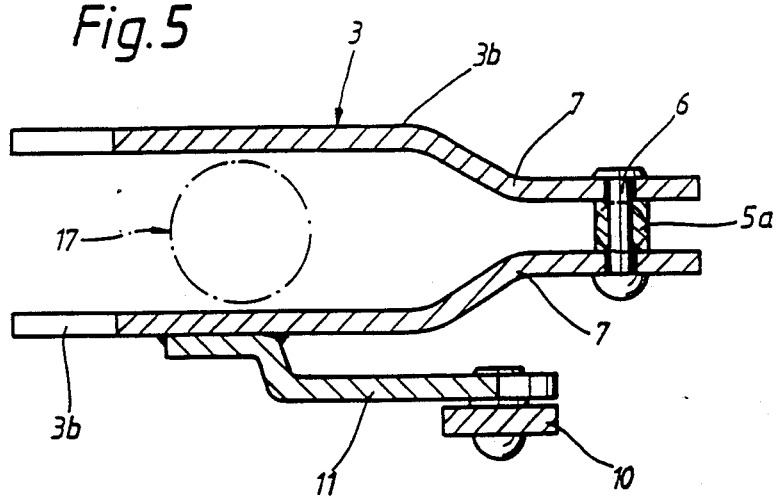
FIG. 5 shows the schematic section corresponding to the line V—V in FIG. 1.

To ensure that an introduction of the assisting forces does not lead to deformations of the canopy framework, which deformations could impair the ease of movement during the folding procedure, it is advantageous if the lower end region 3b is fork-shaped. As can be seen from FIGS. 4 and 5, the hydraulic cylinder 17 or another rod element can in this case be arranged between the two fork cheeks of the end region 3b, and the mutual spacing of the fork cheeks must be somewhat greater than the diameter of the hydraulic cylinder 17 or another rod element.

In this arrangement, a central movement path and a favorable introduction of force into the arm 14 can be achieved if a bearing pin 19 is pivotably mounted in both fork cheeks of the end region, passing through bores in the latter, and if, between the two bearing locations, it is designed in the manner of a crankshaft throw. A bearing eye 17b at the end can thereby receive lateral guidance. For the purpose of torque transmission between the bearing locations of the bearing pin 19 and in the region of passage through the lever 12, the bearing pin 19 is square or serrated, as indicated by cross lines, resulting in absolutely reliable torque conversion of the advance of the piston rod 17a into the desired swivelling movement of the lever 12.

For reasons of weight, it is furthermore desirable for the actuating lever 7 to be formed integrally on the canopy strut 3. At the same time, a uniform force input of the driving advance of the piston rod 5 via both fork cheeks of the end region 3b was aimed at. In order to keep the bearing width of the bearing eye 5a low, this also having a beneficial effect on the amount of installation space used, the fork cheeks of the end region 3b each merge integrally into an actuating lever 7, the distance between them shortening, between which actuating levers the bearing eye 5a is laterally guided with an exact fit in normal width.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Swivel-assistance to a roof-skin holding bow forming a lower end of a folding canopy having canopy support struts of a main hoop, comprising:
    lateral limbs of the roof-skin holding bow which each end with a bent lever;
    an angle lever arranged adjacent to each of the bent levers of the lateral limbs and having a same shape as the associated bent lever, one end of each of the angle levers being connected to an associated lateral limb by a rotary/sliding connection and an other end of each of the angle levers being pivotally mounted on an associated canopy strut at a bearing pin;
    a rod element, having an alterable length, for affixing each of the lateral limbs of the holding bow to an associated canopy strut of the main hoop, each of the rod elements being articulated at both ends and arranged in a side wall region of the folding canopy, a first end of each of the rod elements being connected to an associated lateral limb of the roof-skin holding bow, and a second end of each of the rod elements being connected in articulated fashion to the associated canopy strut; and
    an arm for articulation of the each of the rod elements on the roof-skin holding bow, one end of each of the arms being rigidly connected to an associated angle lever at the bearing point and another end of the each of the arms being pivotally connected to the first end of the associated rod element;
    whereby articulation points of the rod element on the canopy strut and at the second lever of the roof-skin holding bow are arranged in such a way with respect to one another that, when the roof-skin holding bow is raised, a line of action of a spring force extending along a central longitudinal axis of the rod element runs behind the bearing pin and that, following a completion of a first phase of a return swivelling movement of the roof-skin holding bow, the line of action of the spring force runs in front of the bearing pin.

2. Swivel-assistance according to claim 1, wherein a supporting length of the rod element which is present when the roof-skin holding bow is raised can be fixed.

3. Swivel-assistance according to claim 2, wherein the length of the rod element in the supporting position is automatically fixed.

4. Swivel-assistance according to claim 1, wherein the rod element is of telescopic design.

5. Swivel-assistance according to claim 4, wherein a pneumatic spring (gas-filled spring device 27) is provided as rod element.

6. Swivel-assistance according to claim 5, wherein a supporting length of the rod element which is present when the roof-skin holding bow is raised can be fixed.

7. Swivel-assistance according to claim 6, wherein the length of the rod element in the supporting position is automatically fixed.

8. Swivel-assistance according to claim 4, wherein a double-acting working cylinder is provided as rod element.

9. Swivel-assistance according to claim 8, wherein a supporting length of the rod element which is present when the roof-skin holding bow is raised can be fixed.

10. Swivel-assistance according to claim 9, wherein the length of the rod element in the supporting position is automatically fixed.

11. Swivel-assistance according to claim 1, wherein the rod element is arranged in a clear fork cross-section of an end region, near to a main bearing, of the canopy strut.

12. Swivel-assistance according to claim 1, wherein the roof-skin holding bow is held under a spring loading in a folding position near to the canopy strut.

13. Swivel-assistance according to claim 12, wherein the spring loading depends on an outwardly-directed spring force of the rod element.

* * * * *